US006100500A

United States Patent [19]

Jefferson, Jr. et al.

[11] Patent Number: 6,100,500

[45] Date of Patent: Aug. 8, 2000

[54] VEHICLE GLASS CLEARING SYSTEM

[76] Inventors: Bobby J. Jefferson, Jr.; Freda Jefferson, both of 3321 E. 113th Ter. #A, Kansas City, Mo. 64137

[21] Appl. No.: 09/082,122

[22] Filed: May 19, 1998

[51] Int. Cl.[7] ................................ B60L 1/02; H05B 3/06; E06B 7/00

[52] U.S. Cl. .......................... 219/203; 219/526; 52/171.2

[58] Field of Search .................................... 219/212, 203, 219/213, 214, 526, 544, 549; 52/171.2, 171.1

[56] References Cited

U.S. PATENT DOCUMENTS

| | | | |
|---|---|---|---|
| 1,777,343 | 10/1930 | Wilson | 219/203 |
| 3,596,352 | 8/1971 | Isler | 29/622 |
| 3,982,092 | 9/1976 | Marriott | 219/203 |
| 4,213,028 | 7/1980 | Wolf | 219/203 |
| 4,581,522 | 4/1986 | Graham | 219/545 |
| 4,633,061 | 12/1986 | Arikawa | 219/202 |
| 4,867,216 | 9/1989 | McKee | 150/166 |
| 4,902,874 | 2/1990 | Tachimori et al. | 219/203 |
| 4,942,286 | 7/1990 | Monter et al. | 219/219 |
| 4,992,672 | 2/1991 | Norton | 307/10.1 |
| 5,029,662 | 7/1991 | Pena | 180/167 |
| 5,057,666 | 10/1991 | Takada | 219/203 |
| 5,159,247 | 10/1992 | Resch | 318/483 |
| 5,173,586 | 12/1992 | Gold | 219/203 |
| 5,176,421 | 1/1993 | Fasiska | 296/136 |
| 5,182,431 | 1/1993 | Koontz et al. | 219/203 |
| 5,208,444 | 5/1993 | Winter et al. | 219/547 |
| 5,414,240 | 5/1995 | Carter et al. | 219/203 |
| 5,434,384 | 7/1995 | Koontz | 214/203 |
| 5,490,707 | 2/1996 | De La Cruz | 296/95.1 |
| 5,653,904 | 8/1997 | Adlparvar et al. | 219/203 |
| 5,697,416 | 12/1997 | Bock et al. | 150/168 |
| 5,710,408 | 1/1998 | Jones | 219/481 |

*Primary Examiner*—Mark Paschall
*Assistant Examiner*—Daniel L. Robinson
*Attorney, Agent, or Firm*—Shook, Hardy & Bacon

[57] ABSTRACT

A vehicle glass clearing system includes an installed portion and an auxiliary heating element system including an auxiliary heating element having a control and drive circuit having mechanisms for detecting the moisture level and the temperature and that provides a higher drive current to the heating element when threshold temperature and moisture levels are detected.

18 Claims, 3 Drawing Sheets

Fig. 1D.
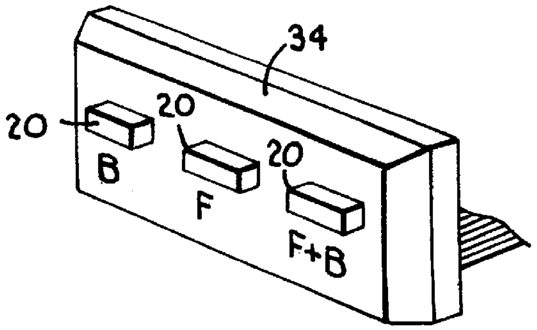
Fig. 1C.
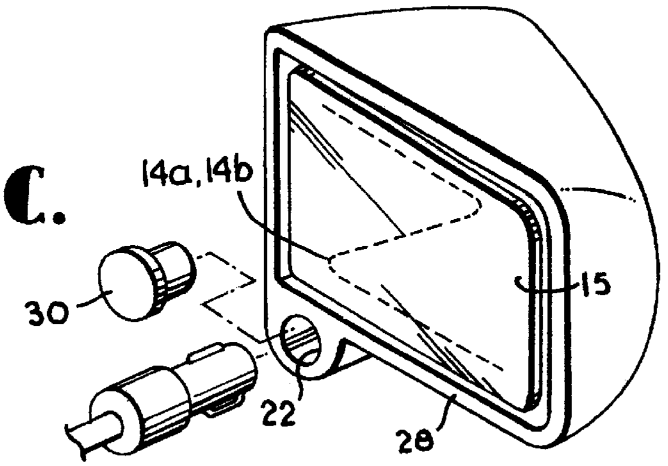
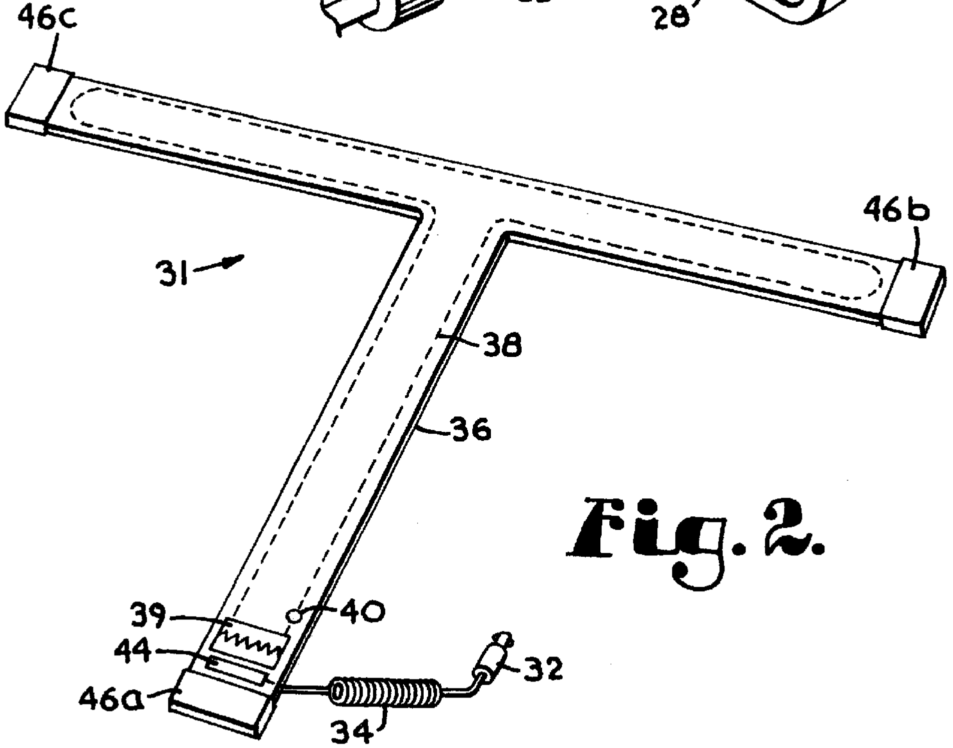
Fig. 2.

Fig. 2A.
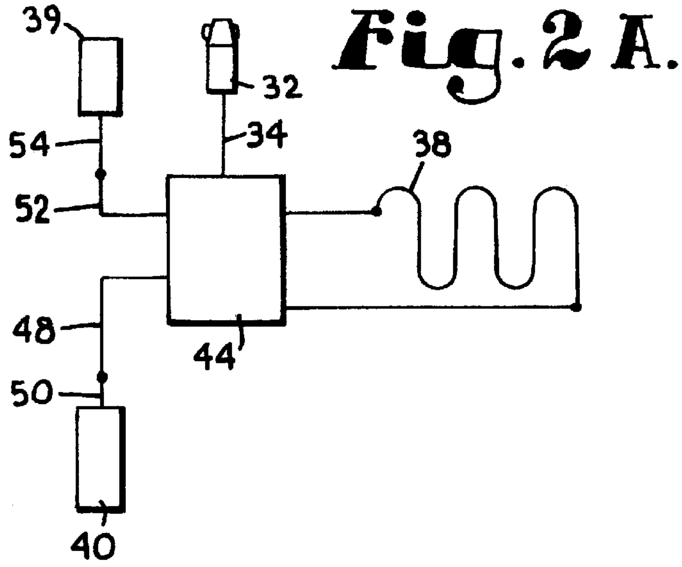
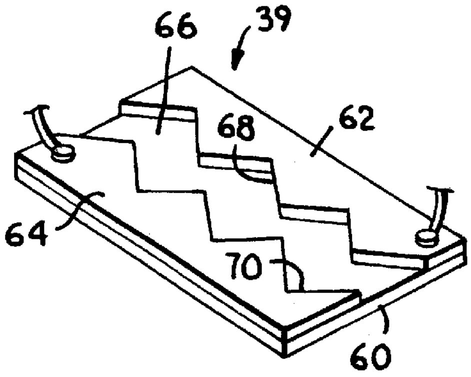
Fig. 2B.
Fig. 3.
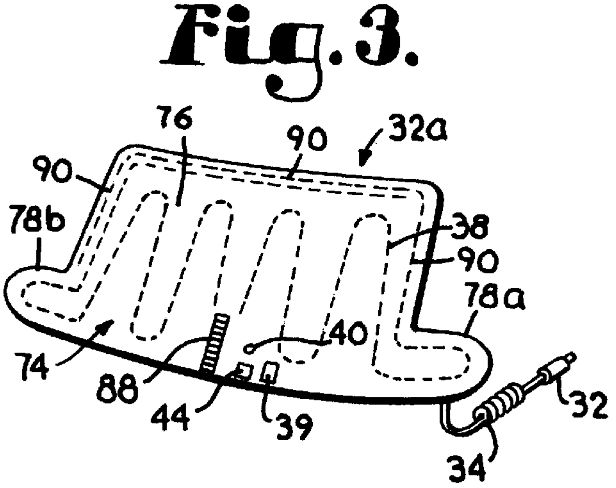
Fig. 4.
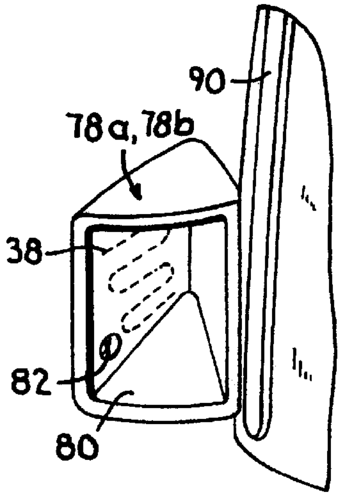

VEHICLE GLASS CLEARING SYSTEM

TECHNICAL FIELD

The present invention relates to vehicle window defogging and defrosting systems and more particularly to a vehicle glass clearing system that includes an installed portion and an auxiliary heating element system that is powered through the installed portion; the installed portion including an auxiliary heating element system power socket, a back window resistive heating element, left and right side view mirror resistive heating elements, a windshield resistive heating element, a first variable duty heating element drive circuit; a first heating element selector switch, a second variable duty heating element drive circuit; a second heating element selector switch, a third variable duty heating element drive circuit; and a third heating element selector switch; the first heating element drive circuit being in electrical driving connection with the back window resistive heating element; the second heating element drive circuit being in electrical driving connection with the left and right side view mirror resistive heating elements and the windshield resistive heating element; the third heating element drive circuit being in electrical driving connection with the back window resistive heating element, the left and right side view mirror resistive heating elements, and the windshield resistive heating element; the first heating element drive circuit being activated by depressing the first heating element selector switch; the second heating element drive circuit being activated by depressing the second heating element selector switch; the third heating element drive circuit being activated by depressing the third heating element selector switch; the auxiliary heating element system including a power plug electrically mateable with the auxiliary heating element system power socket, a heating element sheath having securing magnets in connection therewith, an auxiliary heating element positioned within the heating element sheath, a moisture sensor having a moisture sensed output, a temperature sensor having a temperature sensed output, and an auxiliary heating element control and drive circuit powered through the power plug, in electrical driving connection with the auxiliary heating element, and providing a variable power output to the auxiliary heating element in response to the condition of a temperature sensed input connected to the temperature sensed output and a moisture level sensed input connected to the moisture sensed output.

BACKGROUND ART

It can be dangerous to drive a vehicle when the windows of the vehicle are clouded with moisture or covered with ice. It would be a benefit, therefore, to have a system for clearing and preventing the accumulation of condensed moisture as well as ice and snow on the windows and exterior mirrors of a vehicle. Because weather conditions can change quickly, it would be a benefit to have a vehicle window clearing system that included an auxiliary heating element having a control and drive circuit that included mechanisms for detecting the moisture level and the temperature and that provided a higher drive current to the heating element when threshold temperature and moisture levels are detected.

GENERAL SUMMARY DISCUSSION OF INVENTION

It is thus an object of the invention to provide a vehicle glass clearing system.

It is a further object of the invention to provide a vehicle glass clearing system that includes an auxiliary heating element having a control and drive circuit having mechanisms for detecting the moisture level and the temperature and that provides a higher drive current to the heating element when threshold temperature and moisture levels are detected.

It is a still further object of the invention to provide a vehicle glass clearing system that includes an installed portion and an auxiliary heating element system that is powered through the installed portion; the installed portion including an auxiliary heating element system power socket, a back window resistive heating element, left and right side view mirror resistive heating elements, a windshield resistive heating element, a first variable duty heating element drive circuit; a first heating element selector switch, a second variable duty heating element drive circuit; a second heating element selector switch, a third variable duty heating element drive circuit; and a third heating element selector switch; the first heating element drive circuit being in electrical driving connection with the back window resistive heating element; the second heating element drive circuit being in electrical driving connection with the left and right side view mirror resistive heating elements and the windshield resistive heating element; the third heating element drive circuit being in electrical driving connection with the back window resistive heating element, the left and right side view mirror resistive heating elements, and the windshield resistive heating element; the first heating element drive circuit being activated by depressing the first heating element selector switch; the second heating element drive circuit being activated by depressing the second heating element selector switch; the third heating element drive circuit being activated by depressing the third heating element selector switch; the auxiliary heating element system including a power plug electrically mateable with the auxiliary heating element system power socket, a heating element sheath having securing magnets in connection therewith, an auxiliary heating element positioned within the heating element sheath, a moisture sensor having a moisture sensed output, a temperature sensor having a temperature sensed output, and an auxiliary heating element control and drive circuit powered through the power plug, in electrical driving connection with the auxiliary heating element, and providing a variable power output to the auxiliary heating element in response to the condition of a temperature sensed input connected to the temperature sensed output and a moisture level sensed input connected to the moisture sensed output.

It is a still further object of the invention to provide a vehicle glass clearing system that accomplishes some or all of the above objects in combination.

Accordingly, a vehicle glass clearing system is provided. The vehicle glass clearing system includes an installed portion and an auxiliary heating element system that is powered through the installed portion; the installed portion including an auxiliary heating element system power socket, a back window resistive heating element, left and right side view mirror resistive heating elements, a windshield resistive heating element, a first variable duty heating element drive circuit; a first heating element selector switch, a second variable duty heating element drive circuit; a second heating element selector switch, a third variable duty heating element drive circuit; and a third heating element selector switch; the first heating element drive circuit being in electrical driving connection with the back window resistive heating element; the second heating element drive circuit being in electrical driving connection with the left and right side view mirror resistive heating elements and the windshield resistive heating element; the third heating element drive circuit being in electrical driving connection with the back window resistive heating element, the left and right side view mirror resistive heating elements, and the windshield resistive heating element; the first heating element drive circuit being activated by depressing the first heating element selector switch; the second heating element drive circuit being activated by depressing the second heating element selector switch; the third heating element drive circuit being activated by depressing the third heating element selector switch; the auxiliary heating element system including a power plug electrically mateable with the auxiliary heating element system power socket, a heating element sheath having securing magnets in connection therewith, an auxiliary heating element positioned within the heating element sheath, a moisture sensor having a moisture sensed output, a temperature sensor having a temperature sensed output, and an auxiliary heating element control and drive circuit powered through the power plug, in electrical driving connection with the auxiliary heating element, and providing a variable power output to the auxiliary heating element in response to the condition of a temperature sensed input connected to the temperature sensed output and a moisture level sensed input connected to the moisture sensed output.

In one preferred embodiment the heating element sheath is T-shaped. In another preferred embodiment the heating element sheath includes a central blanket portion and left and right side view mirror pockets and a central elastic inset. At least one of the mirror pockets includes a power plug opening through which the power plug can be inserted into the auxiliary heating element power socket.

In another preferred embodiment the moisture sensor includes a non-conducting substrate, an anode conductor plate secured to the con-conducting substrate, a cathode conductor plate secured to the non-conducting substrate, and a moisture accumulation channel defined between edges of the anode conductor plate and the cathode conductor plate, the edges being spaced such that fluid accumulation between the edges conducts electrical current between the cathode conductor plate and the anode conductor plate in proportion to the degree of accumulated moisture within the moisture accumulation channel.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1C is a perspective showing one of the side view mirror heating elements formed onto the side view mirror; an exemplary auxiliary heating element system power socket formed into the side view mirror housing; a representative power plug of an auxiliary heating element assembly; and a sealing plug for sealing the auxiliary heating element system power socket when it is not in use.

FIG. 1D is a perspective view of a switch housing containing the three heating element drive circuits and the three heating element selector switches.

FIG. 2 is a perspective view showing a first exemplary auxiliary heating element system showing the power plug and cord, the T-shaped heating element sheath, the auxiliary heating element positioned within the heating element sheath, the moisture sensor, the bi-metal thermocouple temperature sensor, the auxiliary heating element control and drive circuit, and the three securing magnets.

FIG. 2A is a schematic diagram of the operational elements of a first exemplary auxiliary heating element system showing the auxiliary heating element control and drive circuit, the power plug and cord, the auxiliary heating element, the moisture sensor, and the bi-metal thermocouple temperature sensor.

FIG. 2B is a perspective view of an exemplary moisture sensor showing the non-conducting substrate, the anode conductor plate, the cathode conductor plate, and the moisture accumulation channel defined between the edges of the anode conductor plate and the cathode conductor plate.

FIG. 3 is a perspective view of a second exemplary auxiliary heating element system showing the power plug and cord; the blanket heating element sheath including the central blanket portion, the left and right side view mirror pockets and the central elastic inset; the auxiliary heating element positioned within the central blanket portion and the left and right side view mirror pockets; the moisture sensor; the bi-metal thermocouple temperature sensor; the auxiliary heating element control and drive circuit, and the perimeter securing magnets.

FIG. 4 is a detail perspective view of one of the side view mirror pockets attached to the central blanket portion showing the mirror housing receiving cavity, the power plug opening, and a section of one of the perimeter securing magnets attached to a section of the perimeter of the central blanket portion.

EXEMPLARY MODE FOR CARRYING OUT THE INVENTION

Figure 1:
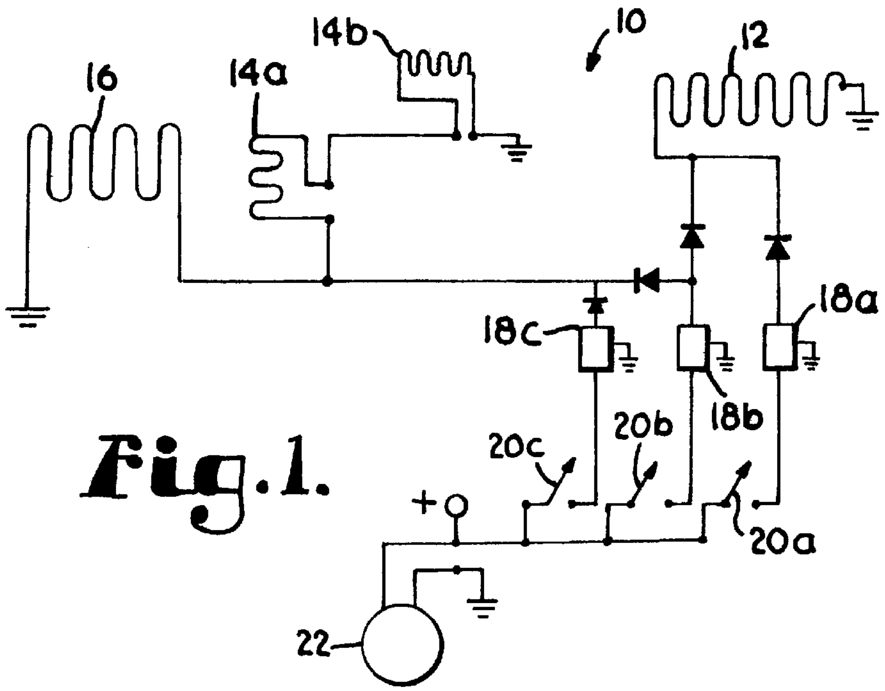
FIG. 1 is a schematic diagram of an exemplary embodiment of the installed portion of the vehicle glass clearing system of the present invention showing the back window heating element, the left and right side view mirror heating elements, the windshield heating element, the three heating element drive circuits, the three heating element selector switches, and the auxiliary heating element system power socket.
Figure 1A:
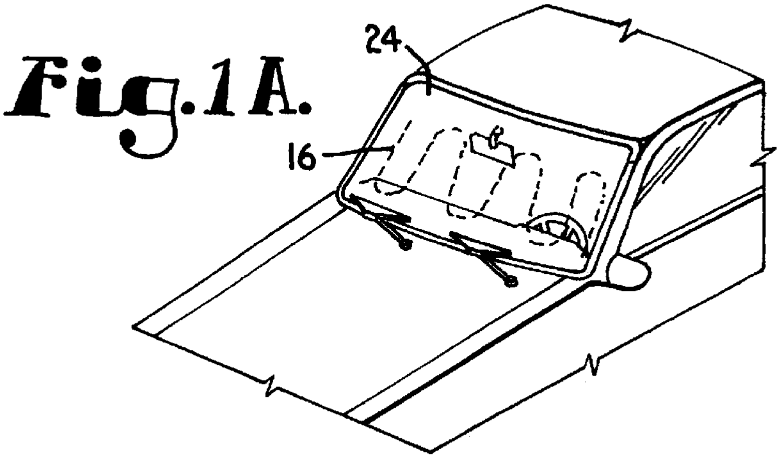
FIG. 1A is a partial perspective view showing the windshield heating element formed onto the windshield of a representative vehicle.
Figure 1B:
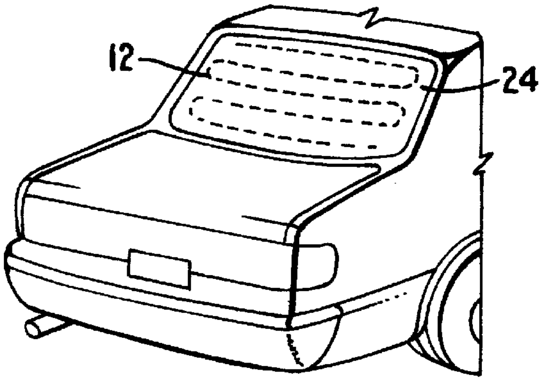
FIG. 1B is a partial perspective view showing the rear window heating element formed onto the rear window of a representative vehicle.

FIG. 1 shows a schematic diagram of an exemplary embodiment of the installed portion of the vehicle glass clearing system of the present invention, generally designated by the numeral 10. Installed portion 10 includes a back window heating element 12, a left side view mirror heating element 14*a*, a right side view mirror heating element 14*b*, a windshield heating element 16, three heating element drive circuits 18*a–c,* three heating element selector switches 20*a–c,* and an auxiliary heating element system power socket 22. Referring to FIG. 1A, windshield heating element 16 is a conventional silk screen deposited resistive heating element that is formed on the interior of a vehicle windshield 24. With reference to FIG. 1B, rear window heating element 12 is a conventional silk screen deposited restive heating element that is formed on the interior of a vehicle rear window 26. With reference to FIG. 1C, side view mirror heating elements 14*a*,14*b* are conventional NiChrome wire resistive heating elements that are attached to the back surface of the left and right side view mirrors 15. In this embodiment, the left side view mirror housing 28 has auxiliary heating element system power socket 22 formed therein. A sealing plug 30 is also provided for sealing auxiliary heating element system power socket 22 when it is not in use.

With reference back to FIG. 1, in this embodiment, the three heating element drive circuits 18*a–c* each include a conventional 555 timer IC that has an output interconnected through blocking diodes to heating elements 12,14*a*,14*b*, and 16. The three heating element drive circuits 18*a–c* are, referring now to FIG. 1D, housed within a molded plastic switch housing 34 that is installable within the vehicle passenger compartment during installation of installed portion 10. The three heating element selector switches 18*a–c* are positioned on the top surface of switch housing 34. Referring once again to FIG. 1, in this embodiment depressing selector switch 20*a* activates back window heating element 12. Depressing selector switch 20*b* activates windshield heating element 16 and left and right side view mirror heating elements 14*a*,14*b*. Depressing selector switch 20*c* activates back window heating element 12, windshield heating element 16 and left and right side view mirror heating elements 14*a*,14*b*.

FIG. 2 shows a first exemplary auxiliary heating element system, generally designated by the numeral 31. Auxiliary heating element system 31 is used when weather conditions are extreme and it is important to maintain an area of vehicle glass ice or fog free such as the vehicle glass and mirrors of emergency response vehicles. Auxiliary heating element system 31 includes a power plug 32, a power cord 34, the T-shaped heat resistant plastic heating element sheath 36, a NiChrome wire auxiliary heating element 38 positioned within T-shaped heating element sheath 36, a moisture sensor 39, a bi-metal thermocouple temperature sensor 40, an auxiliary heating element control and drive circuit 44, and the three securing magnets 46*a–c*.

Referring to FIG. 2A, auxiliary heating element control and drive circuit 44 is a conventional control circuit that is powered through power plug 32 and power cord 34, and that generates a variable current output to auxiliary heating element 38 that corresponds to the condition of the temperature sensed input 48 that is connected to the temperature sensed output 50 of temperature sensor 40 and a moisture level sensed input 52 that is connected to a moisture sensed output 54 of moisture sensor 39. In this embodiment temperature sensor 40 is a conventional bi-metal thermocouple.

Referring to FIG. 2B, moisture sensor 39 includes a non-conducting plastic substrate 60, a metal foil anode conductor plate 62 that is adhesively secured to substrate 60, a metal foil cathode conductor plate 64 that is adhesively secured to substrate 60, and a moisture accumulation channel 66 that is defined between the edges, 68,70, respectively, of anode conductor plate 62 and cathode conductor plate 64. When water accumulates in moisture accumulation channel 66, a conducting path exists between anode conductor plate 62 and cathode conductor plate 64 triggering control circuit 44 to the presence of moisture.

FIG. 3 shows a second exemplary auxiliary heating element system, generally designated 31*a*. Second auxiliary heating element system 31*a* includes a power plug 32, a power cord 34; an auxiliary heating element 38, a moisture sensor 39; temperature sensor 40; and an auxiliary heating element control and drive circuit 44 that are identical to first auxiliary heating element system 31 (FIGS. 2,2A). Second auxiliary heating element system 31*a* includes a blanket heating element sheath, generally designated 74 that includes a central blanket portion 76, a left side view mirror pocket 78*a* and a right side view mirror pocket 78*b*. Referring to FIG. 4, left and right side view mirror pockets 78*a*,78*b* are substantially mirror images of each other and each include a mirror housing receiving cavity 80 and have a section of auxiliary heating element 38 enclosed therein. In this embodiment, left side view mirror pocket 78*a* differs from right side view mirror pocket 78*b* in that left side view mirror pocket 78*a* has a power plug opening 82 through which power plug 32 is insertable into auxiliary heating element system power socket 22 (FIG. 1C). Referring back to FIG. 3, central blanket portion 76 is provided with a central elastic inset 88 that elastically expands to allow a user to position left and right side view mirrors into left and right side view mirror pockets 78*a*,78*b*. Perimeter securing magnets 90 are provided on the interior perimeter edge of blanket portion 76 to further secure auxiliary heating element system 31*a* to the vehicle.

It can be seen from the preceding description that a vehicle glass clearing system has been provided that includes an auxiliary heating element having a control and drive circuit having mechanisms for detecting the moisture level and the temperature and that provides a higher drive current to the heating element when threshold temperature and moisture levels are detected; and that includes an installed portion and an auxiliary heating element system that is powered through the installed portion; the installed portion including an auxiliary heating element system power socket, a back window resistive heating element, left and right side view mirror resistive heating elements, a windshield resistive heating element, a first variable duty heating element drive circuit; a first heating element selector switch, a second variable duty heating element drive circuit; a second heating element selector switch, a third variable duty heating element drive circuit; and a third heating element selector switch; the first heating element drive circuit being in electrical driving connection with the back window resistive heating element; the second heating element drive circuit being in electrical driving connection with the left and right side view mirror resistive heating elements and the windshield resistive heating element; the third heating element drive circuit being in electrical driving connection with the back window resistive heating element, the left and right side view mirror resistive heating elements, and the windshield resistive heating element; the first heating element drive circuit being activated by depressing the first heating element selector switch; the second heating element drive circuit being activated by depressing the second heating element selector switch; the third heating element drive circuit being activated by depressing the third heating element selector switch; the auxiliary heating element system including a power plug electrically mateable with the auxiliary heating element system power socket, a heating element sheath having securing magnets in connection therewith, an auxiliary heating element positioned within the heating element sheath, a moisture sensor having a moisture sensed output, a temperature sensor having a temperature sensed output, and an auxiliary heating element control and drive circuit powered through the power plug, in electrical driving connection with the auxiliary heating element, and providing a variable power output to the auxiliary heating element in response to the condition of a temperature sensed input connected to the temperature sensed output and a moisture level sensed input connected to the moisture sensed output.

It is noted that the embodiment of the vehicle glass clearing system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle glass clearing system for a vehicle having a windshield, a back window, and exterior side view mirrors, comprising:

an installed portion; and an auxiliary heating element system that is powered through said installed portion and that is at least partly positionable adjacent the exterior surface of the vehicle's windshield;

said installed portion including an auxiliary heating element system power socket incorporated within one of said exterior side view mirrors, a back window resistive heating element, left and right side view mirror resistive heating elements, a windshield resistive heating element, a first variable duty heating element drive circuit, a first heating element selector switch, a second variable duty heating element drive circuit, a second heating element selector switch, a third variable duty heating element drive circuit, and a third heating element selector switch;

said first heating element drive circuit being in electrical driving connection with said back window resistive heating element;

said second heating element drive circuit being in electrical driving connection with said left and right side view mirror resistive heating elements and said windshield resistive heating element;

said third heating element drive circuit being in electrical driving connection with said back window resistive heating element, said left and right side view mirror resistive heating elements, and said windshield resistive heating element;

said first heating element drive circuit being activated by depressing said first heating element selector switch;

said second heating element drive circuit being activated by depressing said second heating element selector switch;

said third heating element drive circuit being activated by depressing said third heating element selector switch;

said auxiliary heating element system including a power plug electrically mateable with said auxiliary heating element system power socket, a heating element sheath having securing magnets in connection therewith, said sheath shaped to conform to at least a part of the exterior of the vehicle's windshield, an auxiliary heating element positioned within said heating element sheath, a moisture sensor having a moisture sensed output, a temperature sensor having a temperature sensed output, and an auxiliary heating element control and drive circuit powered through said power plug, in electrical driving connection with said auxiliary heating element, and providing a variable power output to said auxiliary heating element in response to the condition of a temperature sensed input connected to said temperature sensed output and a moisture level sensed input connected to said moisture sensed output.

2. The vehicle glass clearing system of claim 1, wherein: said heating element sheath is T-shaped.

3. The vehicle glass clearing system of claim 1, wherein: said heating element sheath includes a central blanket portion, left and right side view mirror pockets attached to said central blanket portion and a central elastic inset installed within said central portion.

4. The vehicle glass clearing system of claim 3 wherein: at least one of said left and right mirror pockets includes a power plug opening through which said power plug is insertable.

5. The vehicle glass clearing system of claim 1 wherein: said moisture sensor includes a non-conducting substrate, an anode conductor plate secured to said non-conducting substrate, a cathode conductor plate secured to said non-conducting substrate, and a moisture accumulation channel defined between edges of said anode conductor plate and said cathode conductor plate, said edges being spaced such that fluid accumulation between said edges conducts electrical current between said cathode conductor plate and said anode conductor plate in proportion to said degree of accumulated moisture within said moisture accumulation channel.

6. The vehicle glass clearing system of claim 2 wherein: said moisture sensor includes a non-conducting substrate, an anode conductor plate secured to said non-conducting substrate, a cathode conductor plate secured to said non-conducting substrate, and a moisture accumulation channel defined between edges of said anode conductor plate and said cathode conductor plate, said edges being spaced such that fluid accumulation between said edges conducts electrical current between said cathode conductor plate and said anode conductor plate in proportion to said degree of accumulated moisture within said moisture accumulation channel.

7. The vehicle glass clearing system of claim 3 wherein: said moisture sensor includes a non-conducting substrate, an anode conductor plate secured to said non-conducting substrate, a cathode conductor plate secured to said non-conducting substrate, and a moisture accumulation channel defined between edges of said anode conductor plate and said cathode conductor plate, said edges being spaced such that fluid accumulation between said edges conducts electrical current between said cathode conductor plate and said anode conductor plate in proportion to said degree of accumulated moisture within said moisture accumulation channel.

8. The vehicle glass clearing system of claim 4 wherein: said moisture sensor includes a non-conducting substrate, an anode conductor plate secured to said non-conducting substrate, a cathode conductor plate secured to said non-conducting substrate, and a moisture accumulation channel defined between edges of said anode conductor plate and said cathode conductor plate, said edges being spaced such that fluid accumulation between said edges conducts electrical current between said cathode conductor plate and said anode conductor plate in proportion to said degree of accumulated moisture within said moisture accumulation channel.

9. A vehicle glass clearing system, usable with a vehicle having a front windshield and at least one exterior side view mirror, said system comprising:

at least one side view mirror heating element, adapted to be placed in registration with a side view mirror of the vehicle;

a windshield heating element adapted to be placed in registration with the front windshield of the vehicle;

a first heating element drive circuit in electrical driving connection with said side view mirror heating element and said windshield heating element;

a first heating element selector switch in electrical connection with said first drive circuit, said drive circuit being activated by depressing said first selector switch;

an auxiliary heating element system power socket incorporated within said at least one exterior side view mirror and adapted to be coupled to the vehicle; and an auxiliary heating element system, said auxiliary heating system including a power plug mateable with said power socket, a heating element sheath shaped to conform to at least a part of the exterior of the vehicle's windshield, an auxiliary heating element positioned within said sheath, and an auxiliary heating element control and drive circuit powered through said plug and said power socket, said auxiliary control and drive circuit being in electrical driving connection with said auxiliary heating element, wherein said side view mirror and said windshield may be cleared by depressing said first selector switch, activating said first drive circuit and said side view mirror heating element and said windshield heating element, and wherein said auxiliary heating element system may be placed adjacent the windshield of the vehicle providing additional defrosting capabilities.

10. The vehicle glass clearing system of claim 9, wherein the vehicle has two side view mirrors, said system further comprising two side view mirror heating elements, each of which is adapted to be placed in connection with the side view mirrors of the vehicle.

11. The vehicle glass clearing system of claim 10, wherein the vehicle has a back window, the system further comprising:

a back window heating element adapted to be placed in registration with the back window of the vehicle and on the exterior thereof;

a second heating element drive circuit in electrical driving connection with said back window heating element; and a second heating element selector switch in electrical connection with said second drive circuit, said second drive circuit being activated by depressing said second selector switch, wherein said side view mirror and said windshield may be cleared by depressing said first selector switch, activating said first drive circuit and said side view mirror heating element and said windshield heating element, and wherein the back window may be cleared by depressing said second selector switch, activating said second drive circuit and said back window heating element.

12. The vehicle glass clearing system of claim 11, further comprising;

a third heating element drive circuit in electrical connection with said back window heating element, said windshield heating element and said side view mirror heating elements; and a third heating element selector switch in electrical connection with said third drive circuit, said third drive circuit being activated by depressing said third selector switch, wherein said side view mirrors, said windshield and said back window may be cleared by depressing said third selector switch.

13. The vehicle glass clearing system of claim 12, wherein said auxiliary heating system further includes securing magnets coupled in said sheath, said magnets providing a coupling mechanism that can be used to secure said auxiliary heating system to the vehicle.

14. The vehicle glass clearing system of claim 13, wherein said auxiliary heating system further includes a moisture sensor having a moisture sensed output and a temperature sensor having a temperature sensed output, and wherein said auxiliary control and drive circuit provides a variable power output to said auxiliary heating element in response to the condition of a temperature sensed input connected to said temperature sensed output and a moisture level sensed input connected to said moisture sensed output.

15. The vehicle glass clearing system of claim 14, wherein said sheath is T-shaped.

16. The vehicle glass clearing system of claim 14, wherein said sheath includes a central blanket portion, a left and a right side view mirror pocket which are attached to said blanket portion and a central elastic inset installed within said central portion.

17. The vehicle glass clearing system of claim 16, wherein at least one of said left and right mirror pockets includes a power plug opening through which said power plug is insertable.

18. The vehicle glass clearing system of claim 17, wherein said moisture sensor includes a non-conducting substrate, an anode conductor plate secured to said non-conducting substrate, a cathode conductor plate secured to said non-conducting substrate, and a moisture accumulation channel defined between edges of said anode conductor plate and said cathode conductor plate, said edges being spaced such that fluid accumulation between said edges conducts electrical current between said cathode conductor plate and said anode conductor plate in proportion to said degree of accumulated moisture within said moisture accumulation channel.

* * * * *